United States Patent [19]
Suzuki

[11] Patent Number: 5,249,857
[45] Date of Patent: Oct. 5, 1993

[54] BUILT-UP FURNITURE UNIT

[75] Inventor: Hideo Suzuki, Tokyo, Japan

[73] Assignee: Kyoraku Co., Ltd., Kyoto, Japan

[21] Appl. No.: 765,414

[22] Filed: Sep. 24, 1991

Related U.S. Application Data

[63] Continuation of Ser. No. 604,273, Oct. 29, 1990, abandoned.

[30] Foreign Application Priority Data

Oct. 30, 1989 [JP] Japan .................................. 1-279972

[51] Int. Cl.⁵ ............................................ A47B 47/00
[52] U.S. Cl. ................................ 312/263; 312/249.8; 403/231; 403/403
[58] Field of Search .................. 312/249.8, 263, 265.5, 312/265.6, 257.1; 211/189; 403/231, 403

[56] References Cited

U.S. PATENT DOCUMENTS

| | | | |
|---|---|---|---|
| 3,752,552 | 8/1973 | MacDonald | 312/263 X |
| 3,779,623 | 12/1973 | Motohashi | 312/257.1 |
| 4,421,366 | 12/1983 | Niziol | 312/265.6 |
| 4,747,644 | 5/1988 | Gallery et al. | 312/250 X |
| 4,762,379 | 8/1988 | Beam et al. | 312/320 |
| 4,998,023 | 3/1991 | Kitts | 312/108 X |

FOREIGN PATENT DOCUMENTS

| | | | |
|---|---|---|---|
| 1196370 | 11/1985 | Canada . | |
| 904821 | 11/1945 | France | 312/257.1 |
| 62-06809 | 11/1987 | Japan . | |
| 62-200541 | 12/1987 | Japan . | |
| 64-21618 | 2/1989 | Japan . | |

*Primary Examiner*—Kenneth J. Dorner
*Assistant Examiner*—Brian K. Green
*Attorney, Agent, or Firm*—Armstrong, Westerman, Hattori, McLeland & Naughton

[57] ABSTRACT

A built-up furniture unit formed by joining a plurality of housing panels to one another, at least one of each joined pair of the housing panels being formed into a hollw doublewalled construction by blow molding a thermoplastic resin. The housing panels are joined to one another by the interposition of a plurality of reinforcing members and a plurality of bolts threadingly engages with the reinforcing members, respectively, and/or by the interposition of plural pairs of interposing members and a plurality of connector members both being connected to one another by means of bolts.

4 Claims, 8 Drawing Sheets

BUILT-UP FURNITURE UNIT

This application is a continuation of application Ser. No. 07/604,273, filed Oct. 29, 1990, now abandoned.

BACKGROUND OF THE INVENTION

1. Field of the Invention

This invention relates to a built-up furniture unit, and more particularly to built-up furniture units whose side panels are formed by housing panels which are formed into a hollow double-walled construction by blow molding a thermoplastic resin, such as wagons, portable or stationary type cabinets, racks, desks, chests and work tables and the like for home use, industrial use, office-work use, etc.

2. Description of the Prior Art:

Examples of the built-up furniture unit of the kind specified above include a container as disclosed in Japanese Utility Model Application Laid-open Publication NO. SHO 62-200541 and a built-up construction of as desk panel as disclosed in Japanese Utility Model Application Laid-Open Publication NO. SHO 64-21618, etc.

In any of the above-mentioned prior art examples, since the portions of the housing panels to be joined to each other are formed in such a construction as to be joined by fitting tongues formed on one of them into grooves formed on the other, when the housing panels are subjected to a loading, the joined portions are deformed, rubbing or chafing against each other, which results in offensive creak from the joined portions thus displeasing the user.

Moreover, there has been a problem in that the joined portions are inadequate in mechanical strength.

Light-weight having panels for use in built-up furniture units which possess a relatively excellent rigidity can be obtained by blow molding a thermoplastic resin into a hollow doubled-walled construction, however, there is a problem in that they are not satisfactory as structural members. Therefore, even in housing panels formed by a material which is excellent in mechanical strength, it is very difficult to completely eliminate "deformation due to deflection" and "tottering from side to side" of them when subjected to loading. In the jointed construction of the above-mentioned prior art built-up furniture units, it is envisaged that when the above-mentioned deformation occurs the joined portions of the housing panels will rub against each other while they are kept in pressure contact, thus creating the above-mentioned creak.

SUMMARY OF THE INVENTION

The present invention has been made in view of the above-mentioned circumstances in the prior art, and has for its object to provide a built-up furniture unit wherein even when it is subjected to a loading, thus causing deformation of housing panels constituting the furniture unit, the relative displacement in the joined portions thereof is reduced so that the generation of creak in these portions can be prevented and also the mechanical strength of the joined portions can be improved.

To achieve the above-mentioned object, according to a first aspect of the present invention, there is provided a built-up furniture unit formed by joining a plurality of housing panels to one another, at least one of each joined pair of the housing panels being formed into a hollow double-walled construction by blow molding a thermoplastic resin, the unit comprising: a plurality of reinforcing members each having at least one screw-threaded hole formed at a predetermined place thereof and being mounted on one housing panel of each of adjacent pair of housing panels to be joined to each other; and a plurality of bolts each being passed through at least one hole formed at a predetermined place of the other housing panel and being threadably engaged with each of the screw-threaded holes of each of the reinforcing members, wherein the housing panels are joined to one another by threadably engaging these bolts with the plurality of reinforcing members, respectively.

To achieve the above-mentioned object, according to a second aspect of the present invention, there is provided a built-up furniture unit formed by joining a plurality of housing panels to one another, at least one of each joined pair of the housing panels being formed into a hollow double-walled construction by blow molding a thermoplastic resin, the unit comprising; plural pairs of interposing members each having at least one screw-threaded hole formed therethrough and each pair of interposing members being mounted at predetermined places, respectively corresponding to each other, of each pair of housing panels to be joined to each other, and a plurality of connector members each being fixedly secured between each pair of interposing members by means of at least two bolts to thereby join each pair of housing members to each other, wherein the housing panels are joined to one another by fixedly securing means of these connectors to the plural pairs of interposing members through the bolts, respectively.

To achieve the above-mentioned object, according to a third aspect of the present invention, there is provided a built-up furniture unit formed by joining a plruality of housing panels to one another, at least one of each joined pair of the housing panels being formed into a hollow double-walled construction by blow molding a thermoplastic resin, the unit comprising: a plurality of reinforcing members each having at least one screw-threaded hole formed at a predetermined place thereof and being mounted on one housing panel of each pair of housing members; a plurality of bolts each being passed through at least one hole formed at a predetermined place of the other housing panel and being threadably engaged with the screw-threaded holes of each of the reinforcing members; plural pair of interposing members each having at least one screw-threaded hole formed therethrough and each pair of interposing members being mounted at predetermined places, respectively corresponding to each other, of each pair of housing panels to be joined to each other; and a plurality of connector members each being fixedly secured between each pair of interposing members by means of at least two bolts to thereby join each pair of housing panels having the interposing members to each other.

Further, according to a fourth aspect of the present invention, there is provided a built-up furniture unit as set forth in any one of the first to third aspects, characterized in that a slight clearance is kept between mutually adjacent opposed surfaces of each pair of housing panels to be interconnected excluding the places where the reinforcing members and/or said connector members are mounted.

Still further, according to a fifth aspect of the present invention, there is provided a built-up furniture unit as set forth in any one of the first to third aspects, characterized in that the plurality of housing panels comprise a bottom panel, the panels erected on the left and right sides and the rear side of the bottom panel, and a piece of top panel resting on and fixedly secured to these panels, the bottom panel having a higher rigidity than that of each side panel formed by housing panels made by blow modling.

According to the present invention having the above-mentioned aspects, even if the built-up furniture unit is subjected to a loading, thus causing deformation of the housing panels forming the furniture unit, the relative displacement between the joined portions of the housing panels is reduced so that creaking of these portions can be prevented. Moreover, the mechanical strength of the joined portions can be prevented.

Further, according to the first aspect, in particular, since the housing panels are joined to one another by means of bolts through the intermediary of the plate-shaped reinforcing members, the strength of the joined portions of the panels is enhanced and the relative displacement between the joined portions upon deformation thereof can be reduced. Further, since both the housing panels to be interconnected are joined through the intermediary of the reinforcing members, there is no possibility of the joining surfaces of the housing panels contacting directly with each other while they are kept in pressure contact, thereby prevneting the creaking of the joining surfaces due to their rubbing against each other.

Further, according to the second aspect, since the housing panels to be interconnected are joined to one another with a slight clearance kept between the joined surfaces thereof, even if deformation of the housing panels occur, there is no possibility of the housing panels contacting directly with each other while they are kept in pressure contact, so that there is no possibility of the joined portions thereof being subjected to excessive loading, and also creaking of the joined portions can be prevented.

Still further, according to the fifth aspect, the housing panel which forms the bottom panel and is subjected to a higest loading due to the erection of the left-hand and right-hand side panels and the rear panel thereon can be prevented from subjecting to excessive deformation so that they can maintain a rigidity necessary for the builtup furniture unit.

The above-mentioned and other objects, aspects and advantages of the present invention will become apparent to those skilled in the art by making reference to the following description and the accompanying drawings in which preferred embodiments incorporating the principles of the present invention are shown by way of example only.

DETAILED DESCRIPTION OF PREFERRED EMBODIMENTS

The present invention will now be described in detail below by way of several embodiments thereof with reference to the accompanying drawings.

Figure 3A:
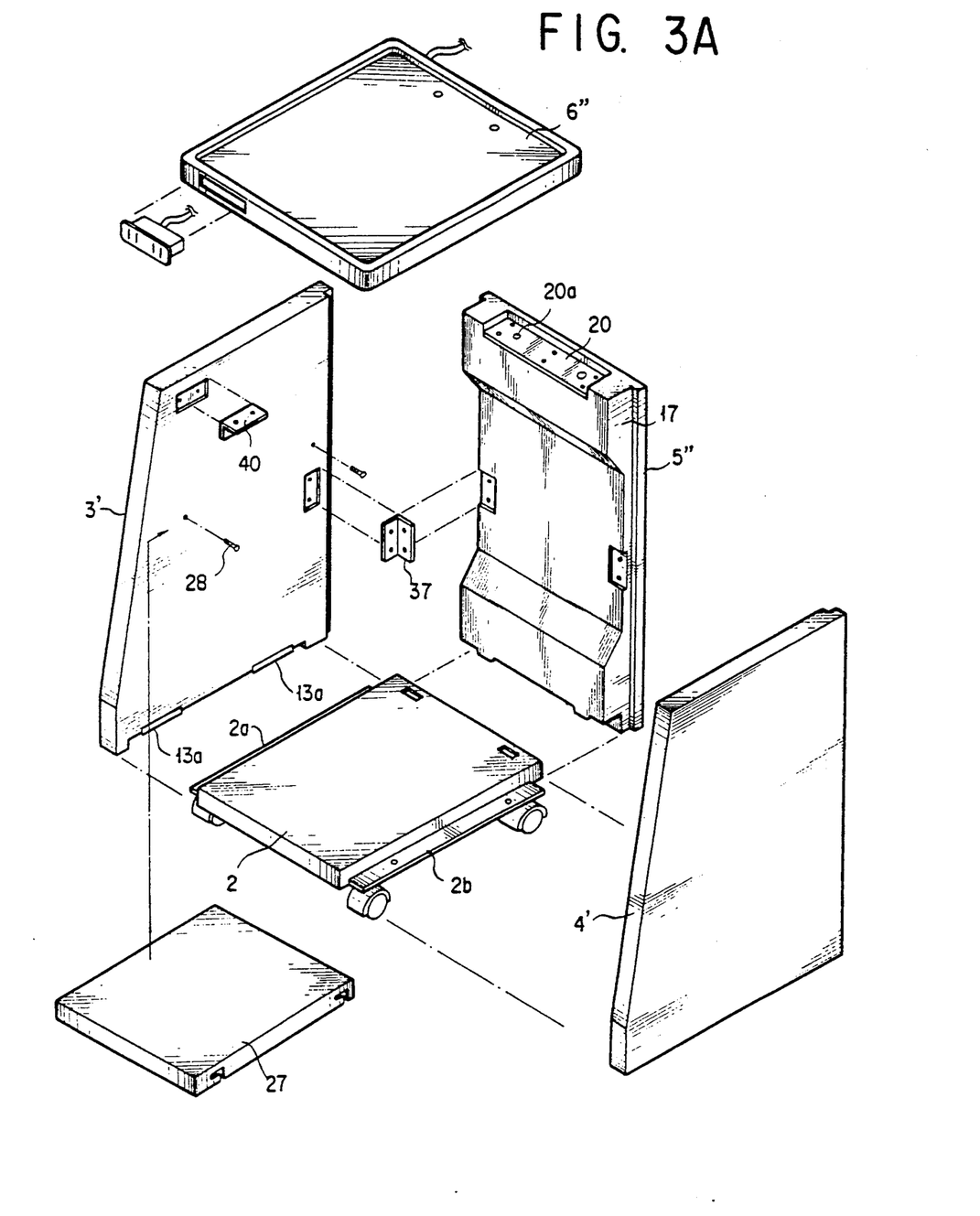
Figure 3B:
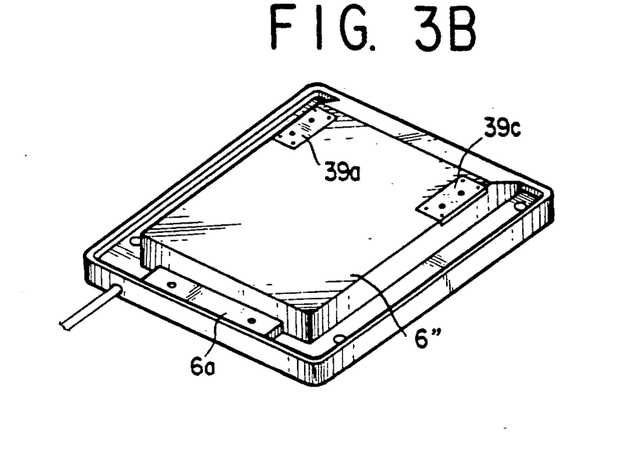
Figure 4:
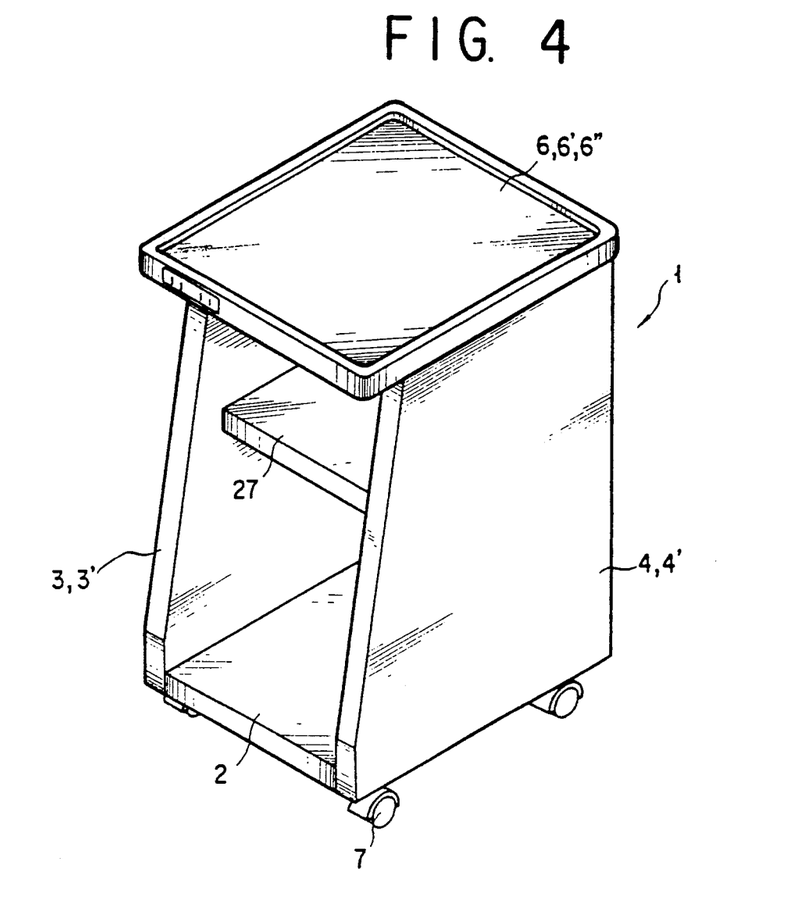
FIG. 4 is a perspective view showing the assembled state of any one of the first to the third embodiments shown in FIGS. 1A, 2A and 3A, respectively.

FIG. 4 shows a wagon 1 adapted for use as a household dresser which is an embodiment of the built-up furniture unit according to the present invention. This wagon 1 is built up in different joining configurations as shown in FIGS. 1A, 1B; 2A, 2B and 3A, 3B respectively.

Figure 1A:
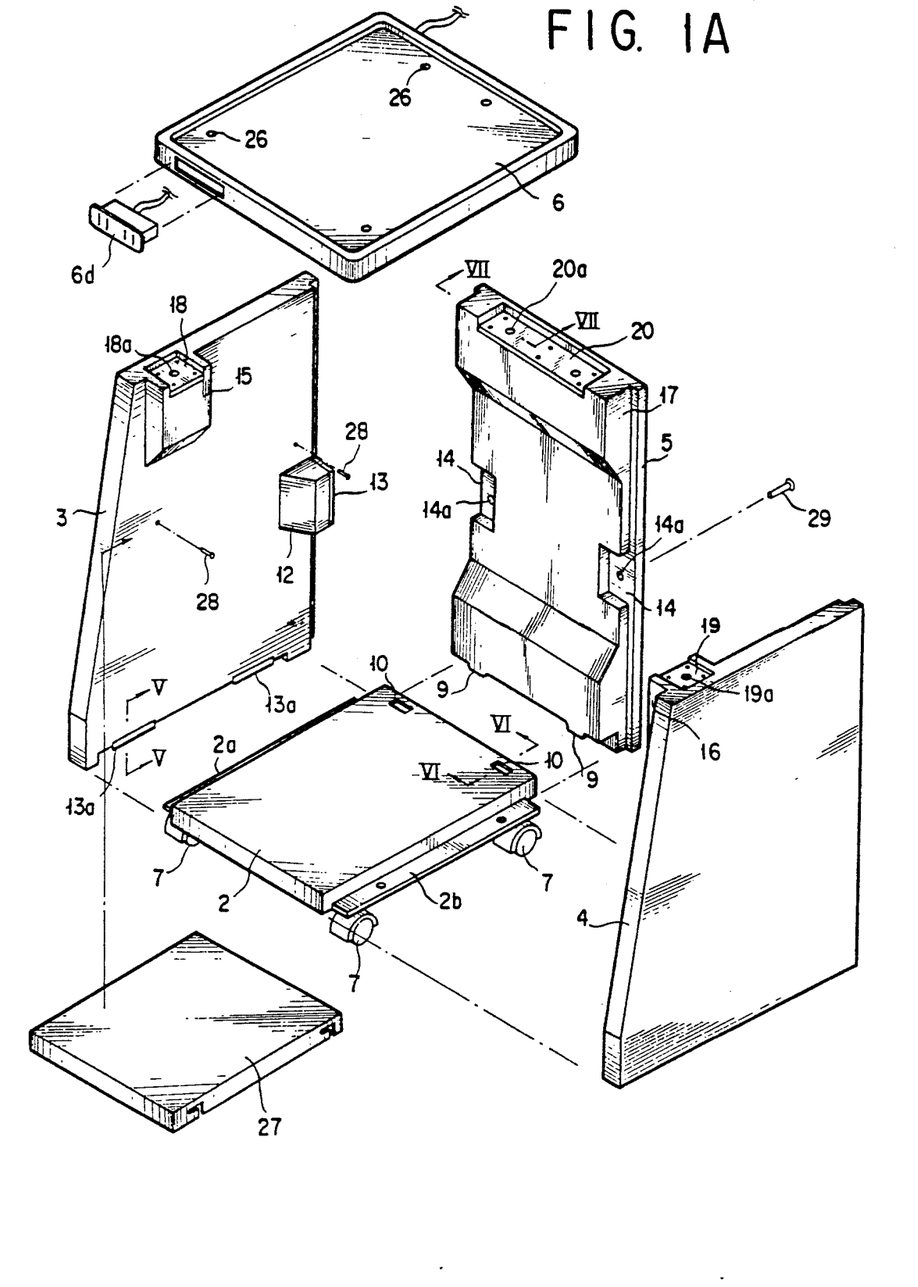
FIGS. 1A, 2A and 3A are exploded perspective views showing first to third embodiments, respectively, of the present invention.
Figure 1B:
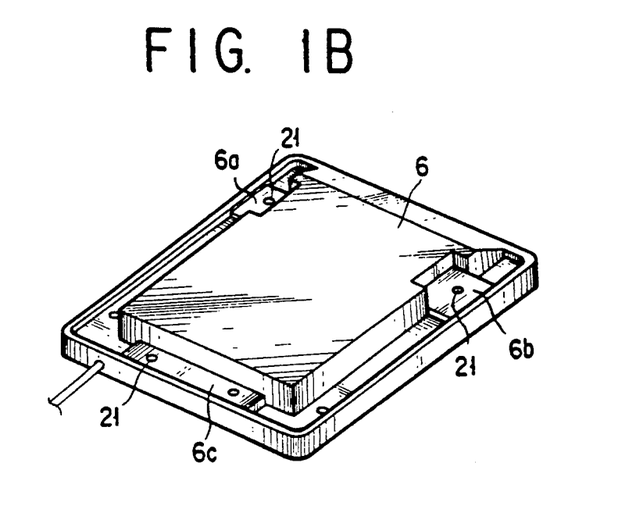
FIGS. 1B, 2B and 3B are perspective views showing lower surfaces of top panels used in the embodiments as shown in FIGS. 1A, 2A and 3A, respectively.

In FIG. 1A and 1B showing a first embodiment of the present invention, reference numeral 2 denotes a bottom panel, 3, 4 left-hand and right-hand side panels adapted to be erected on and fixedly secured to the left and right edges, respectively of the bottom panel 2, 5 a rear panel adapted to be erected on and fixedly secured to the rear edge of the bottom panel 2 and joined to the left-hand and right-hand panels 3 and 4, respectively, at right angles thereto, and 6 a top panel adapted to be joined to the upper ends of the left-hand and right-hand side panels 3 and 4, and the rear panel 5, which meet at right angles with one another.

In the above-mentioned panels 2 to 6 which are housing panels for constructing the wagon 1, the bottom panel 2 is of a structural component such as, for example, a sheet metal construction, and each of bearer plates 2a and 2b fixedly secured to both the left and right edges of the bottom panel 2 has casters 7 mounted rotatably on the underside thereof.

Further, each of the panels 3 to 6 excluding the above-mentioned bottom panel 2 is formed into a doublewalled construction by blow molding a thermoplastic resin which is excellent in mechanical strength such as, for example, modified polyphenylene oxide resin, etc.

Figure 5:
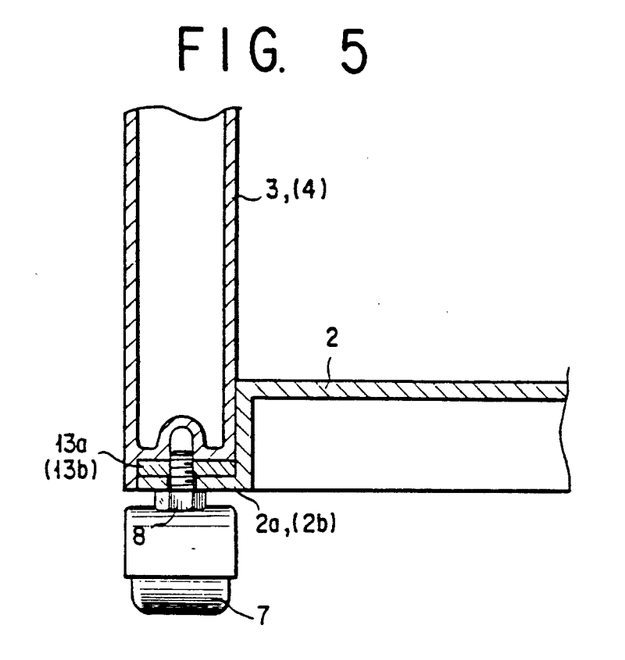
FIGS. 5, 6 and 7 are sectional views showing assembled conditions, which are taken along lines V—V, VI—VI and VII—VII, respectively in FIG. 1.
Figure 6:
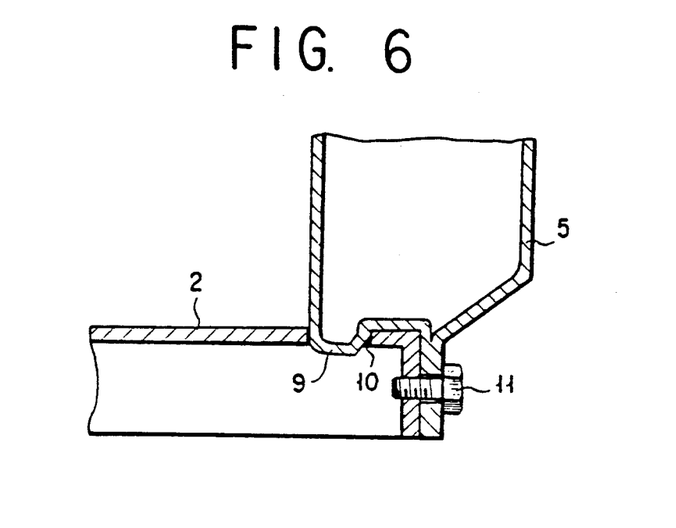

The left-hand side panel 3 and the right-hand side panel 4 are joined to the bottom panel 2 as shown in FIG. 5. Reinforcing members 13a and 13b mounted on the lower ends of both the side panels 3, 4 are rested on the bearer plates 2a, 2b provided on the left and right edges of the bottom panel 2, and joined to the bearer plates 2a, 2b, respectively, by screwing bolts 8 thereinto from the underside thereof. Further, the rear plate 5 is joined to the bottom panel 2 as shown in FIG. 6. The lower end portion of the rear panel 5 is rested on and along one side of the bottom panel 2 so as to fit projections 9 formed on the lower end of the rear panel 5 into holes 10 formed through the bottom panel 2, and then the rear panel 5 is joined to the bottom panel 2 by screwing bolts 11 through the lower parts of the two.

Projecting from the inner surfaces of the above-mentioned left-hand and right-hand side panels 3, 4, respectively, are brackets 12 for rear panel mounting purposes which are formed so as to be located opposite to the inner surface of the hollow bulging rear panel 5. Each of the brackets 12 has a plate-shaped, metallic reinforcing member 13 fixedly secured onto the mounting surface thereof and haivng a screw-threaded hole with which a bolt is threadably engaged.

Whilst, the rear panel 5 has recesses 14 formed on the inside thereof and in which the brackets 12 for rear panel mounting purposes formed on the above-mentioned side panels 3 and 4, respectively, are fitted, and each of the recesses 14 has a hole 14a formed therethrough through which a bolt is passed.

Further, the left-hand and right-hand side panels 3 and 4 and the rear panel 5 have brackets 15, 16 and 17 for top panel mounting purposes, respectively, formed on the inside of their respective upper ends. Each of the brackets 15, 16 and 17 has a mounting seat portion in the form of a recession formed, on the upper surface thereof. Mounted on the mounting seat portions are plate-shaped, metallic reinforcing members 18, 19 and 20 having screw-threaded holes 18a, 19a and 20a, respectively, formed therethrough, with each of which a bolt is threadably engaged.

The top board 6 has mounting/fitting portions 6a, 6b and 6c formed integrally on the underside thereof and adapted to be fitted in the mounting seat portions of the panels 3, 4 and 5, respectively, in a condition wherein the top panel 6 is rested on the upper ends of the side panels 3 and 4 and the rear panel 5. Each of the mounting/fitting portions 6a, 6b and 6c has a hole (or holes) 21 formed therethrough, through which a bolt (or bolts) is (are) passed.

Figure 7:
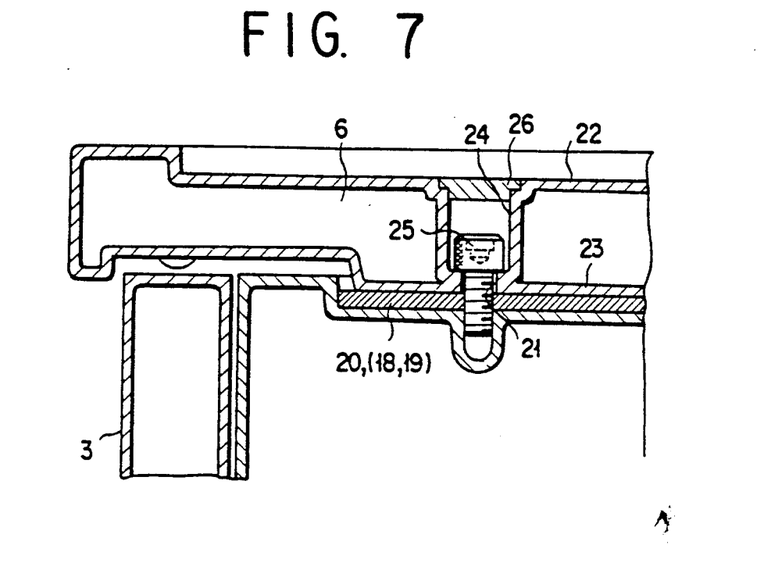

Further, each of the holes 21 made on the underside of the top panel 6 for passing a bolt therethrough is formed, as shown in FIG. 7, for example, in a recess 24 which is formed by depressing an outer wall 22 towards an inner wall 23 in such a way as to force the former wall to be kept into pressure contact with the latter wall. Each of the recesses 24 is closed by means of a cover member 26 after a bolt 25 has been screwed therein (after the assembly).

Reference numeral 27 denotes a shelf adapted to be engaged with and supported by a pin 28 fixedly secured to the inside of the left-hand and right-hand side panels 3 and 4.

In the above-mentioned configuration, the left-hand and right-hand side panels 3 and 4 are joined to the rear panel 5 by fitting the brackets 12 for rear panel mounting purposes formed on the side panels 3 and 4 into the respective recesses 14 formed in the rear panel 5 and threadably engaging bolts 29, which are passed through the recesses 14, respectively, with the screw-threaded holes formed in the reinforcing members 13 fixedly secured to the brackets 12, respectively.

Further, the above-mentioned panels 3, 4 and 5 are joined to the top panel 6 by fitting the mounting/fitting portions 6a, 6b and 6c of the top panel 6 into the mounting seat portions of the brackets 15, 16 and 17 for top panel mounting purposes, respectively, formed integrally on the left-hand and right-hand side panels 3 and 4 and the rear panel 5, and then threadably engaging the bolts 25, which are passed through the holes for the passage of bolts, formed in the mounting/fitting portions 6a, 6b and 6c, respectively, with the screw-threaded holes formed through the reinforcing members 18, 19 and 20 fixedly secured to the mounting seat portions 15a, 16a and 17a, respectively. Further, the top panel 6 has a power supply plug socket 6d attached thereto.

Figure 2A:
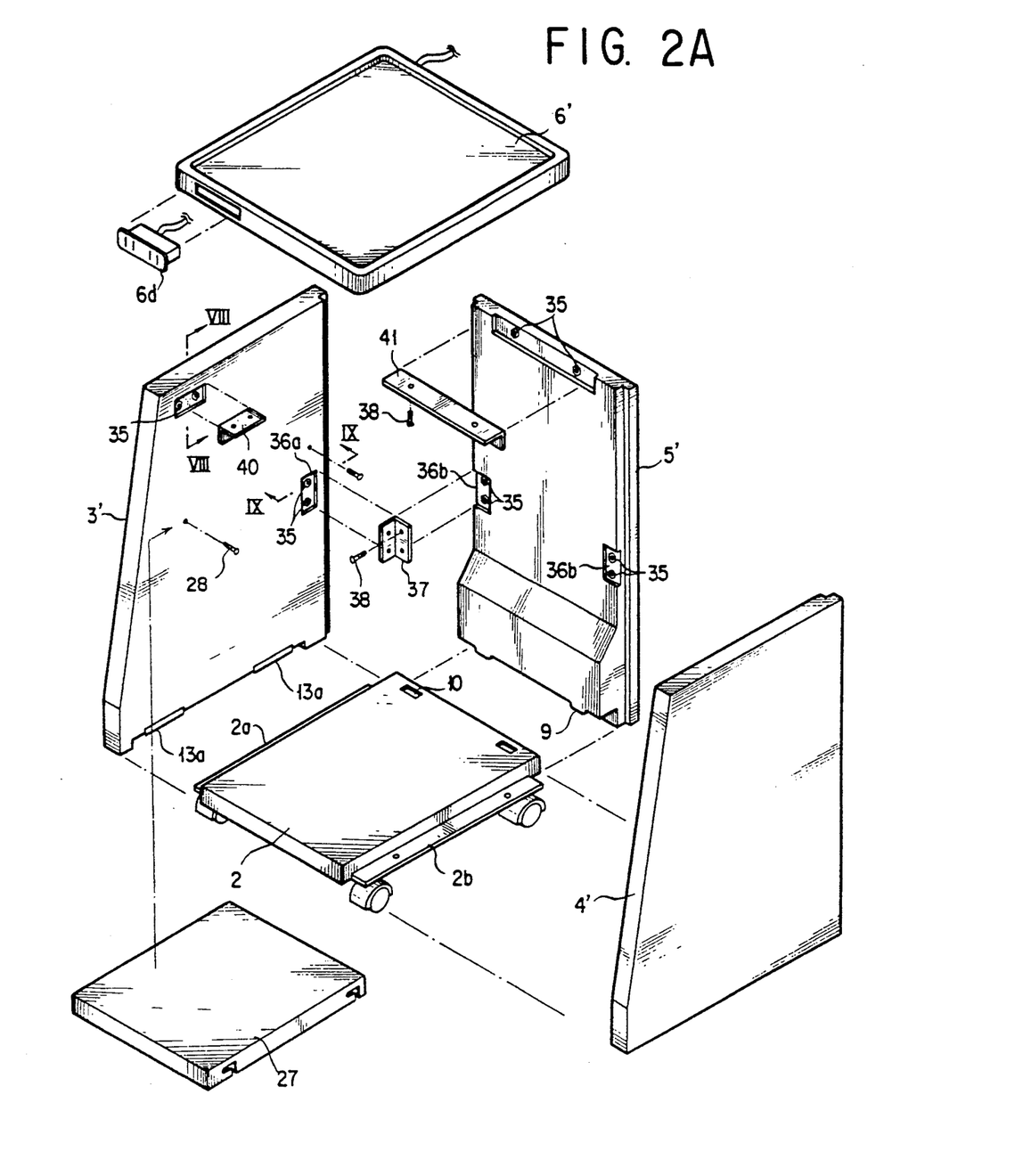
Figure 2B:
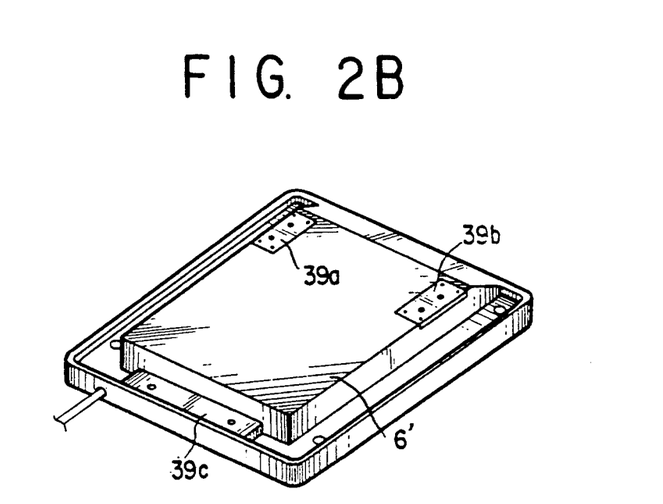
Figure 9:
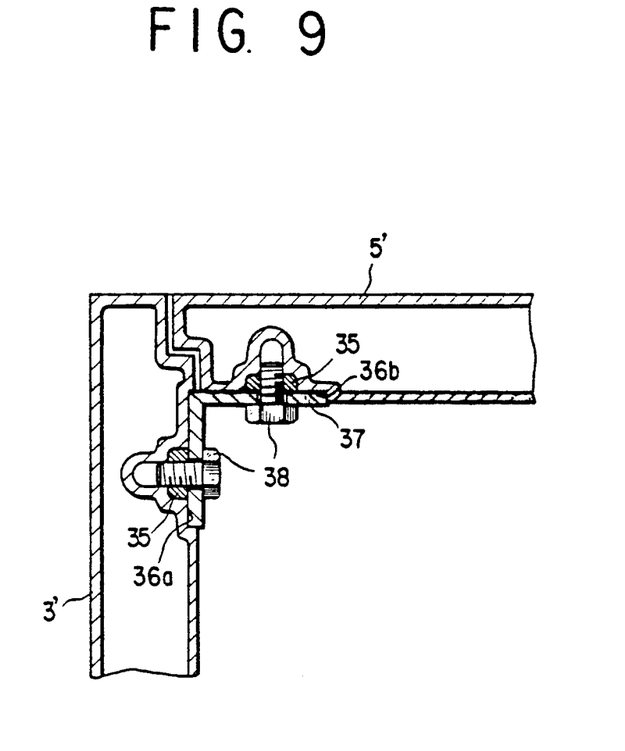

FIG. 2A and 2B show a second embodiment of the present invention wherein left-hand and right-hand side panels 3' and 4' and a rear panel 5' are erected on a bottom panel 2 at right angles to one another and have connector member mounting seat portions 36a, 36b, respectively, formed at the opposed inner corner portions thereof. Each of the connector member mounting seat portions is provided with mounting nuts 35 fixedly secured thereto so as to serve as interposing members. An L-shaped connector member 37 is fixedly secured by means of bolts 38 to each pair of opposed connector member mounting seat portions 36a and 36b. (Refer to FIG. 9).

Figure 8:
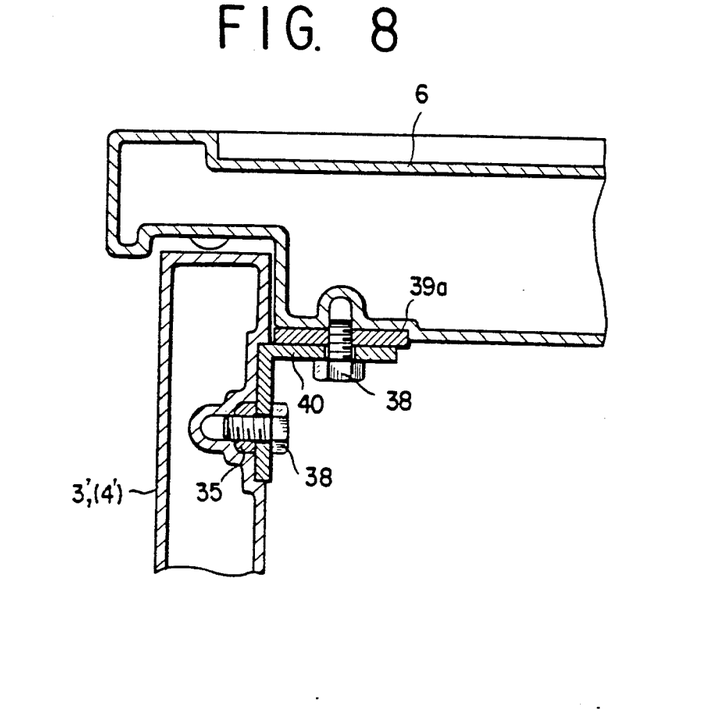
FIGS. 8 and 9 are sectional views showing assembled conditions, which are taken along lines VIII—VIII and IX—IX, respectively, in FIG. 2A.

The top panel 6' has connector member mounting seats which are formed on the corner portions of the lower surface thereof opposite to the upper ends of the left-hand and right-hand side panels 3' and 4' and the rear panel 5, respectively, and to which screw mounting plates 39a, 39b and 39c serving as interposing members are fixedly secured. Further, L-shaped connector members 40 and 41 are fixedly secured by means of bolts 38 to the mutually opposed mounting seats of the side panels 3' and 4', and the rear panel 5', respectively. (Refer to FIG. 8)

In the above-mentioned configuration, the left-hand side panel 3' and the right-hand side panel 4' are joined to the rear panel 5' by means of the L-shaped connector members 37, and these panels 3', 4' and 5' are joined to the top panel 6' by means of the connector members 37, 40 and 41.

FIGS. 3A and 3B show a third embodiment of the present invention wherein the left-hand side panel 3' and the right-hand side panel 4' are joined to a rear panel 5" by means of L-shaped connector members 37, 37, as in the case of the second embodiment. Further, the left-hand side panel 3' and the right-hand side panel 4' are connected to a top panel 6" by means of connector members 40 as in the case of the second embodiment, whilst the rear panel 5" is joined to the top panel 6" by fitting a mounting/fitting portion 6a formed on the underside of the top panel 6" in a mounting seat of the rear panel 5" and screwing bolts 25 therein, as in the case of the first embodiment.

In the built-up constructions of the above-mentioned embodiments, the arrangement is made such that a slight clearance is kept between the mutually adjacement, opposed surfaces of the left-hand side panels 3, 3', the right-hand side panels 4, 4', the rear panels 5, 5', 5" and the top panels 6, 6', 6", respectively, excluding the places where the reinforcing members and the connecting members are mounted.

The plurality of housing panels which are formed into a hollow double-walled construction by blow molding a thermoplastic resin in the first and the second embodiments are indicative of at least two panels out of the housing panels such as the top panel, the left-hand side panel, the right-hand side panel, the rear panel, and the bottom panel. Further, the reinforcing members as set forth in the first embodiment, and the interposing members as set forth in the second embodiment are indicative of plate members, nuts (including self-tapping nuts) or tubular members. In order to attach these members to the housing panels, it is possible to embed these members partially in the material for forming housing panels when blow molding of the latter is made, or fixedly secure by mechanical means such as, for example, bolts., bond by fusion or adhesively bond them after the completion of blow molding of the housing panels. Further, the connector members as set forth in the second embodiment are indicative of L-shaped plates or square pipes. Still further, in the above-mentioned embodiments, the bottom panel may be made of a glass fibre reinforced synthetic resin, a low foaming synthetic resin or wood, which has a higher rigidity than that of each side panel consisting of a housing panel made by blow molding.

The housing panels having a hollow double-walled construction and used for forming the built-up furniture unit of the present invention are manufactured by extruding a blow moldable thermoplastic resin such as modified polyphenylene oxide resin (NORYL which is a tradename of General Electreic Corporation), ABS resin, polycarbonate resin, polyamide resin or polypropylene resin, etc, their blended resins in a plasticized condition in the form of a pipe or sheet and subjecting the extruded pipe or sheet to blow molding by expanding it within a blow mold.

Further, the front and rear walls of the housing panels may be formed with reinforcing ribs, and the hollow portions thereof may be filled with a foamed material.

In the built-up furniture unit of the present invention, it becomes easily possible to change or modify its form. For example, in case it is used as a cabinet within which communication equipments or electronic equipments are built-in, it is preferable for the bottom panel to have a higher rigidity than that of each side panel consisting of a housing panel made of a thermoplastic resin by blow molding. On the other hand, in case it is used as a cabinet within which light weight goods or equipments are built-in or contained, the housing panel made of a thermoplastic resin by blow molding can be used as the bottom panel.

In addition, the built-up furniture unit of the present invention is not limited to such construction parts as a bottom panel, left- and right-hand side panels, a rear panel and a top panel, but can be constructed into a built-up furniture unit even when one or some construction parts are omitted. For example, in case it is use as a wagon, the rear panel portion may be formed by L-shaped extensions of left- and right-hand side panels. In this case, the rear panel may be omitted. Further, it is used as a desk, only the bottom panel or both the bottom and the rear panels can be omitted.

What is claimed is:

1. A built-up furniture unit comprising:
a plurality of housing panels including first and second panels to be connected substantially perpendicular to each other thereby orienting a lengthwise plane of said first panel substantially in a direction parallel to a thickness of said second panel, at least one of said first and second panels being made of a thermoplastic resin in a hollow double wall construction, at least one of said first and second panels being formed with a recess at a plane mating with the other panel, said first panel having at least one first opening extending in a lengthwise direction of said first panel and said second panel having at least one second opening extending in a thickness direction of said second panel and being aligned with said first opening;
a reinforcement member disposed within said recess and oriented substantially in parallel relationship with said other panel, said reinforcement member having at least one third opening placed in alignment with said aligned first and second openings of said first and second panels; and
at least one threaded fastener extending through said first, second and third openings and establishing threaded engagement and a fixed connection between said first and second panels via said reinforcement member.

2. A built-up furniture unit comprising:
a plurality of housing panels including a first panel oriented vertically and a second panel oriented horizontally, said first and second panels being connected substantially in perpendicular relationship to each other, at least one of said first and second panels being made of a thermoplastic resin in a hollow double-wall construction, said first panel having an end portion mating with said second panel and having a portion of greater thickness than a thickness of the remaining portion of said end portion of said first panel for providing an increased mating plane mating with a corresponding plane of said second panel, at least one of said first and second panels being formed with a recess at a plane mating with the other panel, said first panel having at least one first opening extending in a lengthwise direction of said first panel and said second panel having at least one second opening extending in a lengthwise direction of said second panel and being aligned with said first opening;
a reinforcement member disposed within said recess and oriented substantially in parallel relationship with said second panel, said reinforcement member defining at least one third opening placed in alignment with said aligned first and second openings of said first and second panels;
at least one threaded fastener extending through said first, second and third openings and establishing a threaded engagement and a fixed connection between said first and second panels via said reinforcement member; and
a downward extension integrally formed with said second panel and extended downwardly over a joint portion between said mating planes of said first and second panels for covering said joint portion.

3. A built-up furniture unit comprising:
a plurality of housing panels including first and second panels to be connected substantially perpendicular to each other thereby orienting a lengthwise plane of said first panel substantially in a direction parallel to a thickness of said second panel, at least one of said first and second panels being made of a thermoplastic resin in a hollow double-wall construction, said first panel having an end portion mating with said second panel and having a portion of greater thickness than a thickness of the remaining portion of said end portion of said first panel for providing an increased mating plane mating with a corresponding plane of said second panel, at least one of said first and second panels being formed with a recess at the plane mating with the other panel, said first panel having at least one first opening extending in a lengthwise direction of said first panel and said second panel having at least one second opening extending in a direction of the thickness of said second panel and being aligned with said first opening;
a reinforcement member disposed within said recess and oriented substantially in parallel relationship with said second panel, said reinforcement member defining at least one third opening placed in alignment with said aligned first and second openings of said first and second panels; and
at least one threaded fastener extending through said first, second and third openings and establishing a fixed threaded connection between said first and second panels via said reinforcement member.

4. A built-up furniture unit comprising:
a plurality of housing panels including first and second panels to be connected substantially perpendicular to each other thereby orienting a lengthwise plane of said first panel substantially in a direction parallel to a thickness of said second panel, at least one of said first and second panels being made of a thermoplastic resin in a hollow double-wall construction, said first panel having an inwardly bulging end portion extending into an interior space of the furniture unit and mating with said second panel to provide a portion of greater thickness than a thickness of the remaining portion of said end portion of said first panel for reinforcement and for providing an increased mating plane mating with a corresponding plane of said second panel, at least one of said first and second panels being formed with a recess at the plane mating with the other panel, said first panel having at least one first opening extending in a lengthwise direction of said first panel and said second panel having at least one second opening extending in a thickness direction of said second panel and being aligned with said first opening;

a reinforcement member disposed within said recess and oriented substantially in parallel relationship with said second panel, said reinforcement member having at least one third opening placed in alignment with said aligned first and second openings of said first and second panels; and at least one threaded fastener extending through said first, second and third openings for threaded engagement to establish a fixed connection between said first and second panels via said reinforcement member.

* * * * *